(No Model.) 2 Sheets—Sheet 1.

E. ROBBINS.
TACKLE BLOCK.

No. 350,771. Patented Oct. 12, 1886.

Witnesses
Jona. Luther
Mirick H. Cowden

Inventor
Elisha Robbins (No Model.) 2 Sheets—Sheet 2.
E. ROBBINS.
TACKLE BLOCK.
No. 350,771. Patented Oct. 12, 1886.
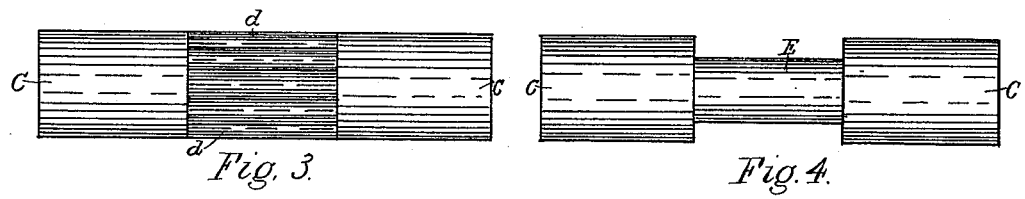
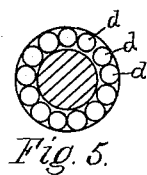
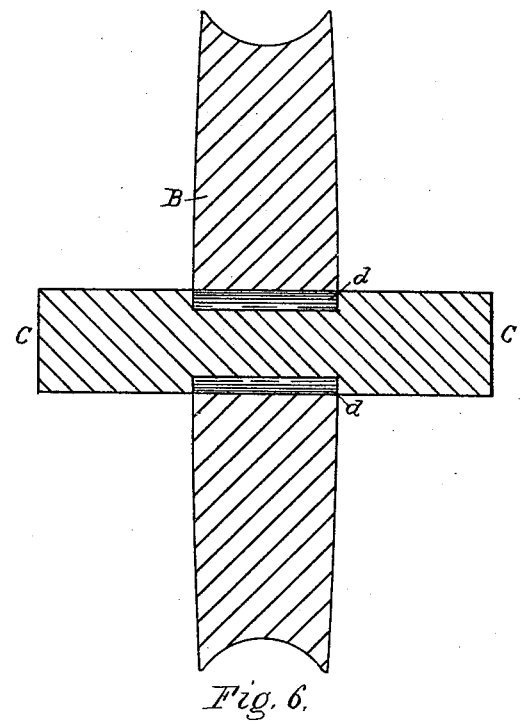
Witnesses
Jona. Louther
Mirick H. Coombs
Inventor
Elisha Robbins

UNITED STATES PATENT OFFICE.

ELISHA ROBBINS, OF WORCESTER, MASSACHUSETTS, ASSIGNOR TO HENRY C. W. ROBBINS, OF SAME PLACE.

TACKLE-BLOCK.

SPECIFICATION forming part of Letters Patent No. 350,771, dated October 12, 1886.

Application filed May 21, 1886. Serial No. 202,868. (No model.)

*To all whom it may concern:*

Be it known that I, ELISHA ROBBINS, of the city and county of Worcester, in the Commonwealth of Massachusetts, have invented a new and useful Improvement in Tackle-Blocks for Hoisting Purposes, of which the following is a specification.

The object of my device is to reduce the friction of the sheave in its bearing on the pin or axle, and also avoid friction or chafing of the sheave against the inner sides of the shell. I attain this by making a groove or recess encircling the pin the length of the bearing of the sheave in which is laid a series of anti-friction rolls encircling the groove, and on which the sheave takes its bearing, to be revolved together in the block, the rolls being free to revolve with the sheave round the pin in the groove. To avoid any friction or chafing of the sheave against the inner sides of the shell, the sheave is made slightly convex on the sides from its bearing to its outer rim, and, besides this, the anti-friction rolls are helpful in this respect.

Figure 1:
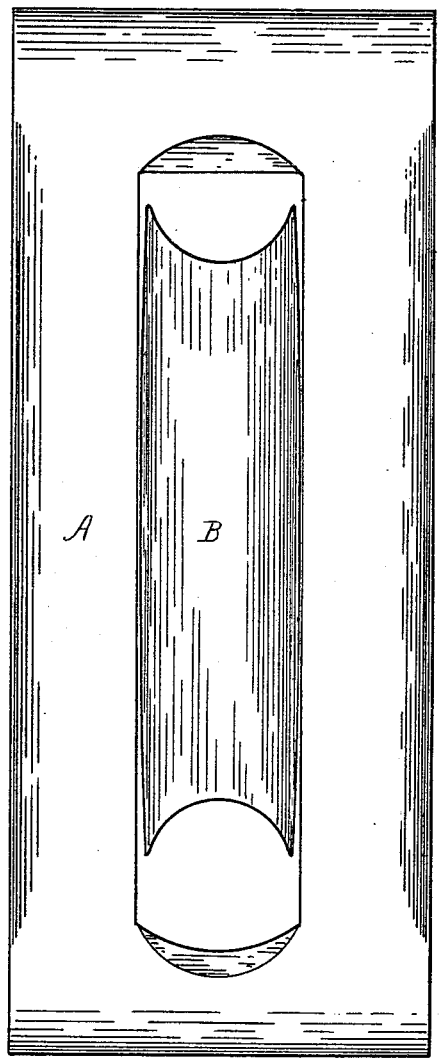
Figure 2:
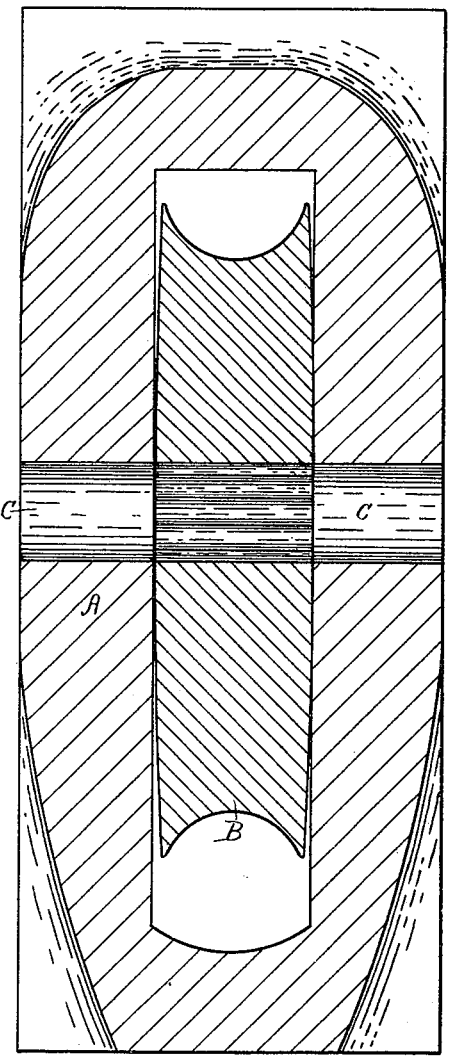

Referring to the drawings accompanying this specification, Figure 1, Sheet 1, represents an edge view of the block and sheave adjusted therein. Fig. 2 represents a vertical sectional view of the same, showing the adjustment of the sheave on the anti-friction-roller pin. Fig. 3, Sheet 2, represents the pin or axle, showing the series of rolls in the groove just filling it flush on a line with the ends of the pin. Fig. 4 represents the pin, showing the form of the groove, the rolls taken out. Fig. 5 is a sectional end view of the pin, taken at the ends of the rolls, showing the ends of the rolls as they encircle the groove of the pin. Fig. 6 is a vertical sectional view of the pin and sheave through the center of the axle, showing a roll at top and bottom.

Similar letters indicate similar parts in the several drawings.

A denotes the block in which the sheave B is adjusted, and C denotes the pin, and *d d d* the series of anti-friction rolls inserted in the groove or recess E of the pin. These rolls are laid in the groove when the parts are put together, and constitute the bearing of the sheave in the block.

I am aware the anti-friction rolls have been used in tackle blocks and in wagon-wheels and pulleys in various forms prior to my invention. I therefore do not claim the anti-friction rolls as such, broadly, in a tackle-block; but What I do claim as my invention or device, and desire to secure by Letters Patent, is—

In a pulley-block, the combination of the block, the sheave, pin C, having the circumferential groove or recess of the width of the sheave, and the anti-friction rollers encircling the reduced portion of the pin and filling the groove flush with the periphery of the pin, the anti-friction rollers forming the bearing of the sheave, all substantially as described.

ELISHA ROBBINS.

Witnesses:
 JONA. LUTHER,
 MIRICK H. COWDEN.